United States Patent
Daimer

(10) Patent No.: US 9,797,304 B2
(45) Date of Patent: Oct. 24, 2017

(54) EXHAUST GAS TURBOCHARGER

(71) Applicant: Bosch Mahle Turbo Systems GmbH & Co. KG, Stuttgart (DE)

(72) Inventor: Guido Daimer, Remseck (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 353 days.

(21) Appl. No.: 14/598,165

(22) Filed: Jan. 15, 2015

(65) Prior Publication Data
US 2015/0198084 A1    Jul. 16, 2015

(30) Foreign Application Priority Data
Jan. 16, 2014 (DE) .................... 10 2014 200 743

(51) Int. Cl.
*F01D 25/16* (2006.01)
*F02B 47/08* (2006.01)
(Continued)

(52) U.S. Cl.
CPC ............ *F02B 47/08* (2013.01); *F01D 25/164* (2013.01); *F04D 25/024* (2013.01);
(Continued)

(58) Field of Classification Search
CPC .. F01D 25/164; F04D 25/062; F04D 29/0563; F04D 29/059; F04D 29/668; F16C 27/066; F05D 2240/54; F05D 2260/96
See application file for complete search history.

(56) References Cited

U.S. PATENT DOCUMENTS 7,415,878 B2 * 8/2008 Gutknecht .......... F04D 29/0563
                                                              73/455
8,784,036 B2 * 7/2014 Woollenweber ........ F01D 5/082
                                                              415/112
(Continued)

FOREIGN PATENT DOCUMENTS

| CN | 101446235 A | 6/2009 |
| DE | 102012200623 A1 | 7/2013 |
| EP | 2535607 A1 | 12/2012 |

OTHER PUBLICATIONS

English abstract for EP-2535607.
English abstract for DE-102012200623.
German Search Report for DE102014200743.7.
(Continued)

*Primary Examiner* — Ninh H Nguyen
(74) *Attorney, Agent, or Firm* — Fishman Stewart PLLC

(57) ABSTRACT

An exhaust gas turbocharger for an internal combustion engine may include a rotor with a turbine wheel of a turbine, a compressor wheel of a compressor and a shaft. The shaft may be connected to the turbine wheel and to the compressor wheel in a rotationally fixed manner. A bearing cartridge may be included for mounting the rotor in a housing. The bearing cartridge may have an inner sleeve arranged on the shaft axially between the turbine wheel and the compressor wheel with respect to an axis of rotation and an outer sleeve arranged coaxial thereto. The outer sleeve may be rotatably mounted on the inner sleeve via at least one rolling body. At least two damping rings may be included which are coaxially arranged on the outer sleeve axially spaced from one another and supported on a respective bearing section of the housing.

20 Claims, 2 Drawing Sheets

(51) Int. Cl.
    *F04D 29/056*    (2006.01)
    *F04D 29/66*     (2006.01)
    *F04D 25/02*     (2006.01)
    *F16C 19/18*     (2006.01)
    *F16C 27/06*     (2006.01)
    *F16C 33/66*     (2006.01)

(52) U.S. Cl.
    CPC ....... *F04D 29/0563* (2013.01); *F04D 29/668* (2013.01); *F16C 19/184* (2013.01); *F16C 27/066* (2013.01); *F05D 2220/40* (2013.01); *F05D 2240/54* (2013.01); *F05D 2260/37* (2013.01); *F05D 2260/96* (2013.01); *F05D 2300/601* (2013.01); *F05D 2300/614* (2013.01); *F16C 33/6659* (2013.01); *F16C 2360/24* (2013.01)

(56) References Cited

U.S. PATENT DOCUMENTS

| | | |
|---|---|---|
| 2004/0200215 A1 | 10/2004 | Woollenweber et al. |
| 2007/0110351 A1 | 5/2007 | Larue |
| 2009/0081040 A1* | 3/2009 | Ueno ............... F16C 19/55 415/229 |
| 2009/0139201 A1 | 6/2009 | Storace |
| 2011/0081231 A1* | 4/2011 | Hoelzer ............ F04D 19/042 415/119 |
| 2015/0267740 A1* | 9/2015 | Ryu ................. F01D 25/16 384/103 |

OTHER PUBLICATIONS

Chinese Office Action dated Dec. 30, 2016 related to Chinese Patent Application No. 201410796180.9.

* cited by examiner

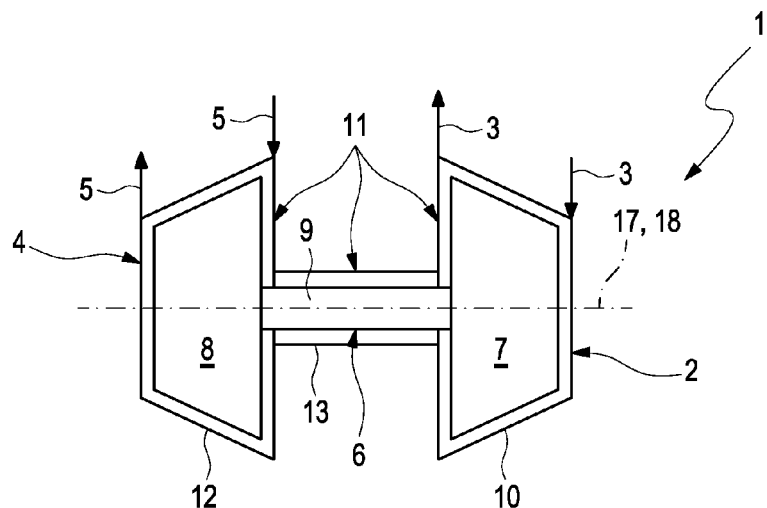
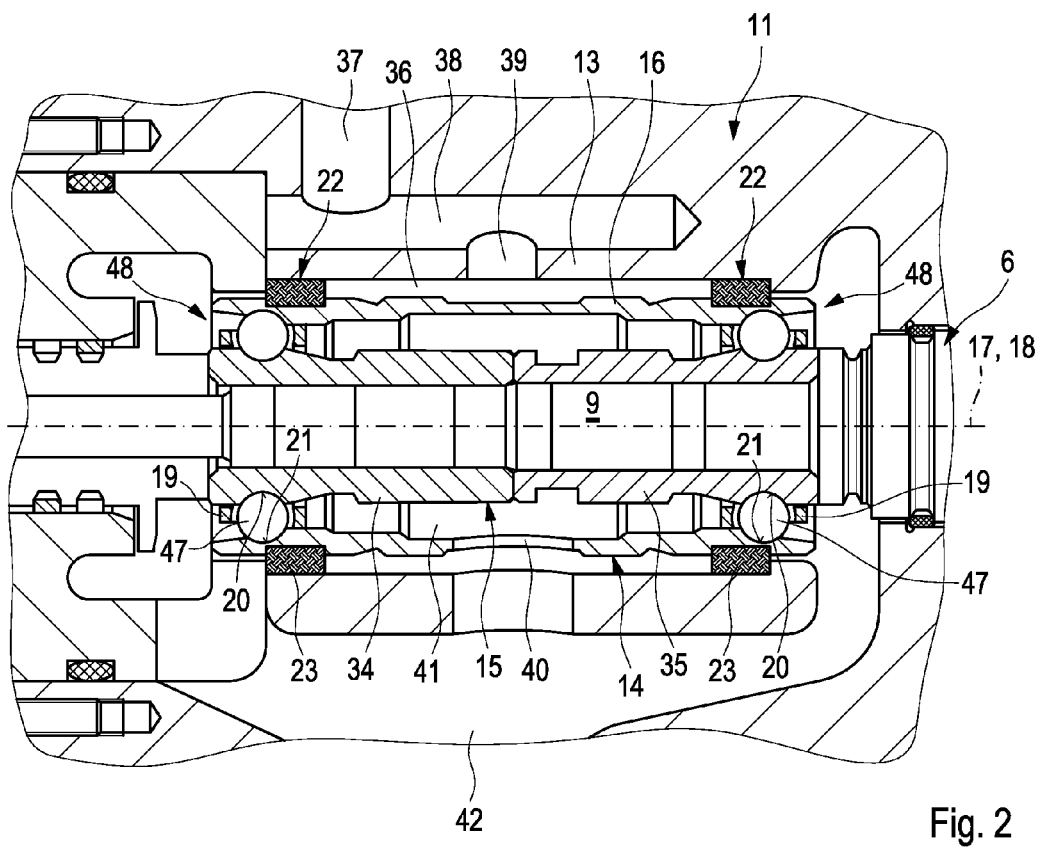
Fig. 1
Fig. 2

EXHAUST GAS TURBOCHARGER

CROSS-REFERENCE TO RELATED APPLICATIONS

This application claims priority to German Patent Application No. 10 2014 200 743.7, filed Jan. 16, 2014, the contents of which are hereby incorporated by reference in their entirety.

TECHNICAL FIELD

The present invention relates to an exhaust gas turbocharger for an internal combustion engine having the features of the preamble of claim 1.

BACKGROUND

From DE 10 2012 200 623 A1 an exhaust gas turbocharger is known, which comprises a rotor and a bearing cartridge for mounting the rotor in a housing of the exhaust gas turbocharger. The rotor comprises a turbine wheel of a turbine of the exhaust gas turbocharger, a compressor wheel of a compressor of the exhaust gas turbocharger and a shaft, which is connected to the turbine wheel and to the compressor wheel in a rotationally fixed manner. The bearing cartridge comprises an inner sleeve that is coaxially arranged on the shaft axially between the turbine wheel and the compressor wheel in a rotationally fixed manner and an outer sleeve which is coaxial to said inner sleeve, which outer sleeve is rotatably mounted on the inner sleeve via rolling bodies. Furthermore, at least two damping rings are provided which are arranged coaxially on the outer sleeve and axially spaced from one another and which are supported on a bearing section of the housing. With the known exhaust gas turbocharger the damping rings are each formed by a coil spring, which in particular can be a stranded wire-type multiple wire coil spring produced from multiple individual wires.

Damping rings between the outer sleeve of the bearing cartridge and the bearing section of the housing are required in order to dampen undesirable oscillations of the rotor at natural frequencies of the rotor which are critical to bending.

SUMMARY

The present invention deals with the problem of stating an improved or at least another embodiment for an exhaust gas turbocharger of the type mentioned at the outset, which is characterized by a preferably efficient damping oscillations of the rotor.

According to the invention, this problem is solved through the subject of the independent claim. Advantageous embodiments are subject of the dependent claims.

The invention is based on the general idea of producing the damping ring from wire mesh in each case. Within such wire mesh a metal wire or multiple metal wires are interwoven as a result of which within the wire mesh a multitude of contact points and force transmission points is formed, wherein in the region of the contact points relative movements of the individual wires or wire sections relative to one another are additionally possible. These relative movements are subject to severe friction. As a consequence, such wire mesh exhibits a relatively intensive dissipating effect with respect to forces acting thereon. This means that forces which lead to a deformation of the wire mesh are largely removed through friction within the wire mesh, as a result of which an intensive damping effect is obtained. Thus, oscillations of the rotor which reach as far as to the outer sleeve via the bearing cartridge are intensively dampened in the damping rings so that they are not transmitted onto the bearing section of the housing or only to a greatly reduced degree. As a consequence, an oscillation excitation of the housing can be significantly reduced which prevents or reduces interfering noise radiation of the housing.

According to an advantageous embodiment, the damping rings can have a cross-sectional profile which is axially, i.e. parallel to the axis of rotation of the rotor, dimensioned larger than radially, wherein the radial direction in turn relates to the axis of rotation of the rotor. The damping rings in this case can in particular have a rectangular or a substantially rectangular cross-sectional profile. Through this configuration, relative large contact areas between the respective damping ring and the outer sleeve on the one hand and between the respective damping ring and the bearing section on the other hand are present, as a result of which in these regions in particular by way of friction relatively large axial forces can be transmitted. In this regard, this cross-sectional geometry favours an additional function for the damping rings which can consist in axially positioning or fixing the outer sleeve in the bearing section.

According to another advantageous embodiment, the damping rings can each be arranged on the outer sleeve and/or on the bearing section by means of a support ring. Here, the respective support ring can be fastened to the outer sleeve or to the damping ring while the respective damping ring is then inserted in the support ring and axially fixed by the support ring. Alternatively it is likewise possible to fasten the support ring to the damping ring in a fixed manner which can be an assembly advantage. The respective support ring can be L-shaped or U-shaped in its cross-sectional profile in order to fix the respective damping ring in the axial direction through a positively joined connection or through an axial stop.

In another embodiment, axial fixing of the respective damping ring on the outer sleeve can be effected by means of a frictionally joined connection or by means of a positively joined connection or by means of a materially joined connection. In this case, the axial fixing forces between the damping ring and the outer sleeve are either transmitted only via frictionally joined connection or only via materially joined connection or via positively joined connection, wherein a positively joined connection a frictionally joined connection can also be present. A materially joined connection is obtained for example by soldering or welding the respective damping ring to the outer sleeve. A positively joined connection can be realised for example by means of a circumferential groove that is circumferentially closed in the circumferential direction, in which the damping ring can be inserted with or without support ring. A frictionally joined connection is obtained by the friction pairing or the tribological system of damping ring and outer sleeve.

For axially fixing the respective damping ring to the outer sleeve the outer sleeve in another embodiment can comprise an outer circumferential groove in the circumferential direction in which the respective damping ring is inserted or at least one circumferential axial stop in the circumferential direction which the respective damping ring abuts axially. In this case, a positively joined connection for axially securing the respective damping ring with respect to the outer sleeve is realised through contours on the outer sleeve.

In another embodiment, an anti-rotation lock can be provided between the outer sleeve and the respective damping ring which is preferably realised exclusively by means of a frictionally joined connection or by means of materially joined connection. The anti-rotation lock can likewise be realised with the help of a positively joined connection.

Furthermore, axial fixing of the respective damping ring on the bearing section of the housing can be realised by means of a frictionally joined connection or positively joined connection or materially joined connection. An anti-rotation lock can likewise be realised between the respective damping ring and the bearing section of the housing by means of a frictionally joined connection or a positively joined connection or a materially joined connection.

An anti-rotation lock by means of a positively joined connection is obtained through radial protrusions and/or depressions on the damping ring and on the outer sleeve or on the damping ring and the bearing section.

For axially fixing the respective damping ring on the bearing section of the housing, the bearing section according to another embodiment can comprise an inner circumferential groove in the circumferential direction into which the respective damping ring is inserted, or at least one circumferential axial stop in the circumferential direction, which the respective damping ring abuts axially.

According to another advantageous embodiment, the respective damping ring can be radially and/or axially compressed, wherein this compression in particular takes place largely or exclusively in an elastic deformation region of the respective damping ring. Within the preloaded damping ring higher friction values are obtained, as a result of which the damping effect of the damping ring can be improved.

In a further embodiment, the inner sleeve can be axially divided in two, so that the inner sleeve comprises two inner sleeve parts. The two inner sleeve parts in this case can be mounted on the outer sleeve via separate rolling body arrangements. Because of this, the assembly of the bearing cartridge is simplified.

In another advantageous embodiment it can be provided that the outer sleeve does not have any direct contact with the housing. Because of this direct structure-borne sound transmission between outer sleeve and housing is prevented so that only a dampened transmission via the damping rings is possible.

According to another embodiment, a lubricating oil gap can be present radially between the outer sleeve and the bearing section, wherein the respective damping ring is permeable to lubricating oil. Permeability for lubricating oil that is adequate for the lubrication can be realised with the respective damping ring consisting of woven metal wire with suitable weaving parameters such as wire thickness and mesh size and mesh density.

The lubricating oil gap between the outer sleeve and the bearing section can be utilised for conducting lubricating oil to other regions of the bearing cartridge, in particular to the rolling bodies or to the rolling body arrangements. Within the gap between outer sleeve and bearing section the lubricating oil can simultaneously develop also a certain oscillation damping effect.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description wherein same reference characters refer to same or similar or functionally same components.

BRIEF DESCRIPTION OF THE DRAWINGS

It shows, in each case schematically,

FIG. 1 a highly simplified schematic representation in the manner of a circuit diagram of an exhaust gas turbocharger, FIG. 2 a simplified longitudinal section of the exhaust gas turbocharger in the region of a bearing cartridge, FIG. 3 a greatly simplified longitudinal section in the region of a damping ring in another embodiment, FIG. 4 a cross section of the exhaust gas turbocharger in the region of such a damping ring, however in a further embodiment.

DETAILED DESCRIPTION

Figure 3:
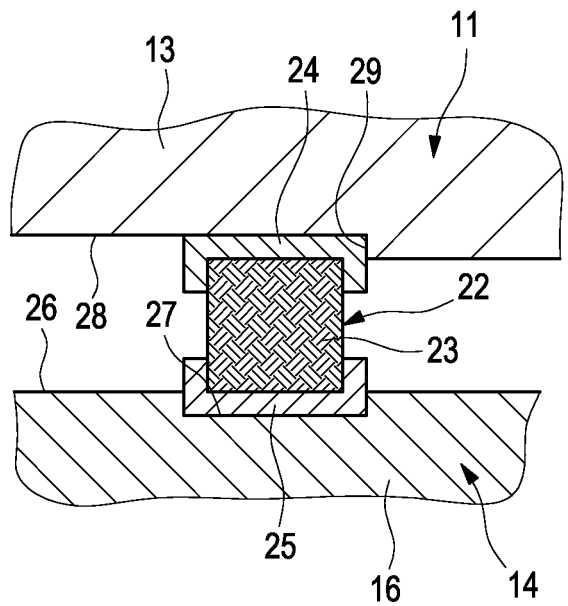

According to FIG. 1, an exhaust gas turbocharger 1, which serves for supercharging an internal combustion engine which is not shown here, comprises in the usual manner a turbine 2 for expanding an exhaust gas flow 3 and a compressor 4 for compressing a fresh air flow 5. Furthermore, the turbocharger 1 comprises a rotor 6, which comprises a turbine wheel 7 of the turbine 2, a compressor wheel 8 of the compressor 4 and a shaft 9, which is connected to the turbine wheel 7 and to the compressor wheel 8 in a rotationally fixed manner. Here, the turbine wheel 7 is arranged in a turbine section 10 of a housing 11 of the turbocharger 1 assigned to the turbine 2. The compressor wheel 8, by contrast, is arranged in a compressor section 12 of the housing 11 assigned to the compressor 4. The shaft 9 extends through a bearing section 13 of the housing 11 arranged between the turbine section 10 and the compressor section 12, in which the rotor 6 is mounted in the housing 11.

According to FIG. 2, a bearing cartridge 14 is provided for mounting the rotor 6 in the housing 11, which comprises an inner sleeve 15 and an outer sleeve 16 which are arranged coaxially to one another and coaxially to an axis of rotation 17 of the rotor 6, wherein the axis of rotation 17 of the rotor 6 is defined by a longitudinal centre axis 18 of the shaft 9. The bearing cartridge 14 is axially arranged between the turbine wheel 7 and the compressor wheel 8 on the shaft 9. Individually, the inner sleeve 15 is axially arranged on the shaft 9 between turbine wheel 7 and compressor wheel 8 in a rotationally fixed and coaxial manner. The outer sleeve 16 is arranged coaxially to the inner sleeve 15 and concentrically thereto. Furthermore, the outer sleeve 16 is rotatably mounted on the inner sleeve 15 via rolling bodies 47. The rolling bodies 47 in this case are preferentially configured as balls. The rolling bodies 47 form two bearing arrangements 48 which are axially spaced from one another, each of which comprise multiple rolling bodies 47. In the example, the rolling bodies 47 of the respective bearing arrangement 88 are positioned with an annular cage 19. Noteworthy is that the respective bearing arrangement 48 comprises an inner running surface 20 directly formed on the inner sleeve 15 and an outer running surface 21 directly formed on the outer sleeve 16. Because of this, the construction of the respective bearing arrangement 48 is extremely small in the radial direction.

Furthermore, at least two damping rings 22 which are axially spaced from one another are provided on the bearing cartridge 14, which can each run around completely in the circumferential direction and which are coaxially arranged on the outer sleeve 16. Furthermore, the damping rings 22 are radially supported on the bearing section 13 of the housing 11. The damping rings 22 shown here are each produced from wire mesh 23. The respective wire mesh 23 in this case can be woven of a single wire, preferentially however of multiple wires. By way of these damping rings 22 the outer sleeve 16 and thus the bearing cartridge 14 and ultimately the entire rotor 6 are held on the bearing section 13 or on the housing 11. In the example of FIG. 2, the damping rings 22 have a cross-sectional profile in a longitudinal section containing the axis of rotation 17 which is substantially formed rectangularly. Here, the cross-sectional profile of the respective damping ring 22 in the axial direction, i.e. parallel to the axis of rotation 17, is larger than in the radial direction, which in the sectional view of FIG. 2 runs perpendicularly to the axis of rotation 17. In the example of FIG. 2, the respective cross-sectional profile in the axial direction is approximately twice as large as in the radial direction. Because of this, a wide support is achieved which is advantageous for the desired oscillation damping.

In the embodiment shown in FIG. 3 another cross-sectional profile for the respective damping ring 22 is presented purely exemplarily. According to FIG. 3, the respective damping ring 22 can be arranged on the bearing section 13 or on the outer sleeve 16 with the help of at least one support ring 24 and 25 respectively. In the example of FIG. 3, two such support rings 24, 25 are shown, namely an outer support ring 24 and an inner support ring 25. The damping ring 22 in this case is arranged on the bearing section 13 via the outer support ring 25 and on the outer sleeve 16 via the inner support ring 25. The outer support ring 24 can be fastened on the bearing section 13 so that the damping ring 22 is inserted in the outer support ring 24. The inner support ring 25 can be fastened on the outer sleeve 16 so that the damping ring 22 is inserted in the inner support ring 25. Likewise it is also conceivable in principle to attach the outer support ring 24 and/or the inner support ring 25 on the damping ring 22 in a fixed manner. In the examples shown here the support ring 24, 25 each have a U-shaped cross section. It is conceivable, in principle, to provide the respective support ring 24, 25 with an L-shaped cross section.

The respective damping ring 22 can be fixed in the axial direction with or without associated support ring 24, 25 on the bearing section 13 and/or on the outer sleeve 16 by means of a frictionally joined connection or a positively joined connection or a materially joined connection. Furthermore, the respective damping ring 22 can be arranged with or without support ring 24, 25 in the circumferential direction on the bearing section 13 and/or on the outer sleeve 16 in a rotationally fixed manner, wherein this anti-rotation lock can be effected by means of a frictionally joined connection or a positively joined connection or a materially joined connection.

In FIG. 3 it is purely exemplarily shown that the outer sleeve 16 on its outer side 26 facing the bearing section 13 can comprise a circumferential outer groove 27 in the circumferential direction, in which the respective damping ring 22 respectively the inner support ring 25 is inserted in order to axially fix the damping ring 22 on the outer sleeve 16. On the bearing section 13, a circumferential axial stop 29 is formed on an inner side 28 facing the bearing cartridge 14 according to FIG. 3 in the circumferential direction, which the damping ring 22 in this case indirectly abuts axially via the outer support ring 24.

Figure 4:
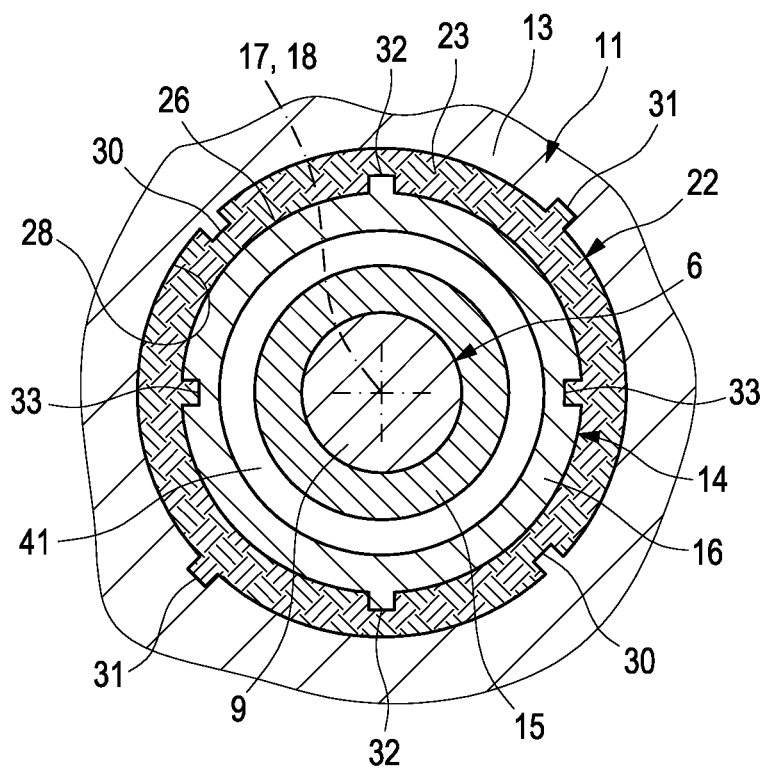

According to FIG. 4, radially orientated protrusions 30 and/or depressions 31 can be formed in the region of the damping ring 22 on the inside 28 of the bearing section 13. Additionally or alternatively, radially orientated protrusions 32 and/or depressions 33 can be formed on the outside 26 of the outer sleeve 16. While the protrusions 30 and 32 respectively can radially engage in the respective damping ring 22, the damping ring 22 can radially engage in the depressions 31, 33. Because of this an intensive positively joined connection between the damping ring 22 and the bearing section 13 on the one hand and between the damping ring 22 and the outer sleeve 16 on the other hand is established.

The damping rings 22 in the assembled state are preferentially compressed at least radially, as a result of which the positioning of the rotor 6 relative to the housing 11 is improved. At the same time, the radial compression of the damping rings 22 results in an internal preload which increases the internal friction within the wire mesh 23 of the damping rings 22. Because of this, the damping effect of the damping rings 22 can be increased.

According to FIG. 2, the inner sleeve 15 is configured in two parts. Accordingly, the inner sleeve 15 comprises two separate inner sleeve parts 34, 35 each of which is mounted on the outer sleeve 16 via a separate bearing arrangement 48. Because of this, the assembly of the bearing cartridge 14 is simplified. In contrast with this, the outer sleeve 16 is preferably produced in one part or from one piece.

It is noteworthy furthermore that the outer sleeve 16 itself does not have any direct contact with the housing 11. Furthermore, a lubricating oil gap 36 is formed here radially between the outer sleeve 16 and the bearing section 13, which likewise extends annularly and coaxially about the outer sleeve 16. Lubrication oil can be fed to the lubrication oil gap 36 via channels 37, 38 and 39. The outer sleeve 16 has a radial opening 40, through which the lubricating oil from the lubricating oil gap 36 reaches an annular intermediate space 41 which is radially formed between the outer sleeve 16 and the inner sleeve 15. By way of this intermediate space 41, the lubricating oil reaches the rolling bodies 47. By way of a return channel 42, the lubricating oil can then be discharged again from the housing 11. The damping rings 22 can be practically configured permeable to the lubricating oil.

The invention claimed is:

1. An exhaust gas turbocharger for an internal combustion engine, comprising:
    a rotor including a turbine wheel of a turbine, a compressor wheel of a compressor and a shaft, the shaft being connected to the turbine wheel and to the compressor wheel in a rotationally fixed manner;
    a bearing cartridge for mounting the rotor in a housing, the bearing cartridge including an inner sleeve arranged on the shaft in a rotationally fixed and coaxial manner axially between the turbine wheel and the compressor wheel with respect to an axis of rotation and an outer sleeve arranged coaxial thereto, the outer sleeve being rotatably mounted on the inner sleeve via at least one rolling body; and
    at least two damping rings composed of a wire mesh arranged coaxially on the outer sleeve, the at least two damping rings disposed axially spaced from one another and supported on a corresponding bearing section of the housing, wherein the at least two damping rings are each arranged on at least one of the outer sleeve and the bearing section via a support ring.

2. The turbocharger according to claim 1, wherein the at least two damping rings respectively have a cross-sectional profile which is dimensioned larger axially than radially.

3. The turbocharger according to claim 1, wherein the at least two damping rings are axially fixed on the outer sleeve via at least one of a frictionally joined connection, a positively joined connection and a materially joined connection.

4. The turbocharger according to claim 1, wherein the outer sleeve for axially fixing the at least two damping rings includes at least one of (i) a circumferential outer groove extending in a circumferential direction, in which at least one of the respective damping rings is inserted, and (ii) at least one circumferential axial stop extending in a circumferential direction, which at least one of the respective damping rings abuts axially.

5. The turbocharger according to claim 1, wherein an anti-rotation lock between the outer sleeve and the at least two respective damping rings is effected by at least one of a frictionally joined connection, a positively joined connection and a materially joined connection.

6. The turbocharger according to claim 1, wherein an axial fixing of the at least two respective damping rings on the bearing section of the housing is effected by at least one of a frictionally joined connection, a positively joined connection and a materially joined connection.

7. The turbocharger according to claim 1, wherein an anti-rotation lock between the at least two respective damping rings and the bearing section of the housing is effected by at least one of a frictionally joined connection, a materially joined connection and a positively joined connection.

8. The turbocharger according to claim 1, wherein the bearing section for axially fixing the at least two respective damping rings includes at least one of (i) a circumferential inner groove extending in a circumferential direction, in which at least one of the respective damping rings is inserted, and (ii) at least one circumferential axial stop extending in a circumferential direction, which at least one of the respective damping rings axially abuts.

9. The turbocharger according to claim 1, wherein at least one of: at least one of the respective damping rings with the support ring is inserted in an outer groove extending circumferentially on the outer sleeve, and at least one of the respective damping rings is supported on an axial stop extending circumferential on the outer sleeve via the support ring.

10. The turbocharger according to claim 1, wherein at least one of: at least one of the respective damping rings with the support ring is inserted in an inner groove extending circumferentially on the bearing section, and at least one of the respective damping rings is supported on an axial stop extending circumferentially on the bearing section via the support ring.

11. The turbocharger according to claim 1, wherein the at least two damping rings are at least one of radially compressed and axially compressed.

12. The turbocharger according to claim 1, wherein the inner sleeve is axially divided into two inner sleeve parts, wherein the two inner sleeve parts are respectively mounted on the outer sleeve via a separate bearing arrangement.

13. The turbocharger according to claim 1, wherein the outer sleeve does not directly contact the housing.

14. The turbocharger according to claim 1, wherein a lubricating oil gap is defined radially between the outer sleeve and the bearing section, the at least two respective damping rings being permeable to lubricating oil.

15. An exhaust gas turbocharger for an internal combustion engine, comprising:
a housing;
a rotor including a turbine wheel rotationally coupled to a compressor wheel via a shaft;
a bearing cartridge mounting the rotor in the housing, the bearing cartridge including an inner sleeve arranged rotationally fixed and coaxial to the shaft with respect to an axis of rotation and an outer sleeve arranged coaxial to the inner sleeve, the outer sleeve being rotatably mounted on the inner sleeve via at least one rolling body, wherein the outer sleeve includes at least one of a circumferentially extending outer groove and at least one circumferentially extending axial stop;
at least two axially spaced damping rings arranged coaxially on the outer sleeve and supported on a respective bearing section of the housing via a support ring, wherein the at least two damping rings are respectively composed of a wire mesh and have a cross-sectional profile with an axial extent larger than a radial extent; and
wherein the at least two damping rings are at least one of inserted into the outer groove of the outer sleeve and supported axially on the at least one axial stop of the outer sleeve.

16. An exhaust gas turbocharger for an internal combustion engine, comprising:
a rotor including a turbine wheel of a turbine, a compressor wheel of a compressor and a shaft, the shaft being connected to the turbine wheel and to the compressor wheel in a rotationally fixed manner;
a bearing cartridge for mounting the rotor in a housing, the bearing cartridge including an inner sleeve arranged on the shaft in a rotationally fixed and coaxial manner axially between the turbine wheel and the compressor wheel with respect to an axis of rotation and an outer sleeve arranged coaxial thereto, the outer sleeve being rotatably mounted on the inner sleeve via at least one rolling body; and
at least two damping rings composed of a wire mesh arranged coaxially on the outer sleeve, the at least two damping rings disposed axially spaced from one another and supported on a corresponding bearing section of the housing, wherein the at least two damping rings are at least one of radially compressed and axially compressed.

17. The turbocharger according to claim 16, wherein the at least two damping rings have an elastic deformation region to facilitate compression.

18. An exhaust gas turbocharger for an internal combustion engine, comprising:
a rotor including a turbine wheel of a turbine, a compressor wheel of a compressor and a shaft, the shaft being connected to the turbine wheel and to the compressor wheel in a rotationally fixed manner;
a bearing cartridge for mounting the rotor in a housing, the bearing cartridge including an inner sleeve arranged on the shaft in a rotationally fixed and coaxial manner axially between the turbine wheel and the compressor wheel with respect to an axis of rotation and an outer sleeve arranged coaxial thereto, the outer sleeve being rotatably mounted on the inner sleeve via at least one rolling body;
at least two damping rings arranged coaxially on the outer sleeve, the at least two damping rings disposed axially spaced from one another and supported on a corresponding bearing section of the housing, wherein the at least two damping rings are composed of a material including a wire mesh; and wherein the inner sleeve is axially divided into two inner sleeve parts, and wherein the two inner sleeve parts are respectively mounted on the outer sleeve via a separate bearing arrangement.

19. The turbocharger according to claim 18, wherein the separate bearing arrangement includes a separate rolling body.

20. The turbocharger according to claim 18, further comprising a lubricating oil gap defined radially between the outer sleeve and the bearing section.

* * * * *